United States Patent Office 3,039,253
Patented June 19, 1962

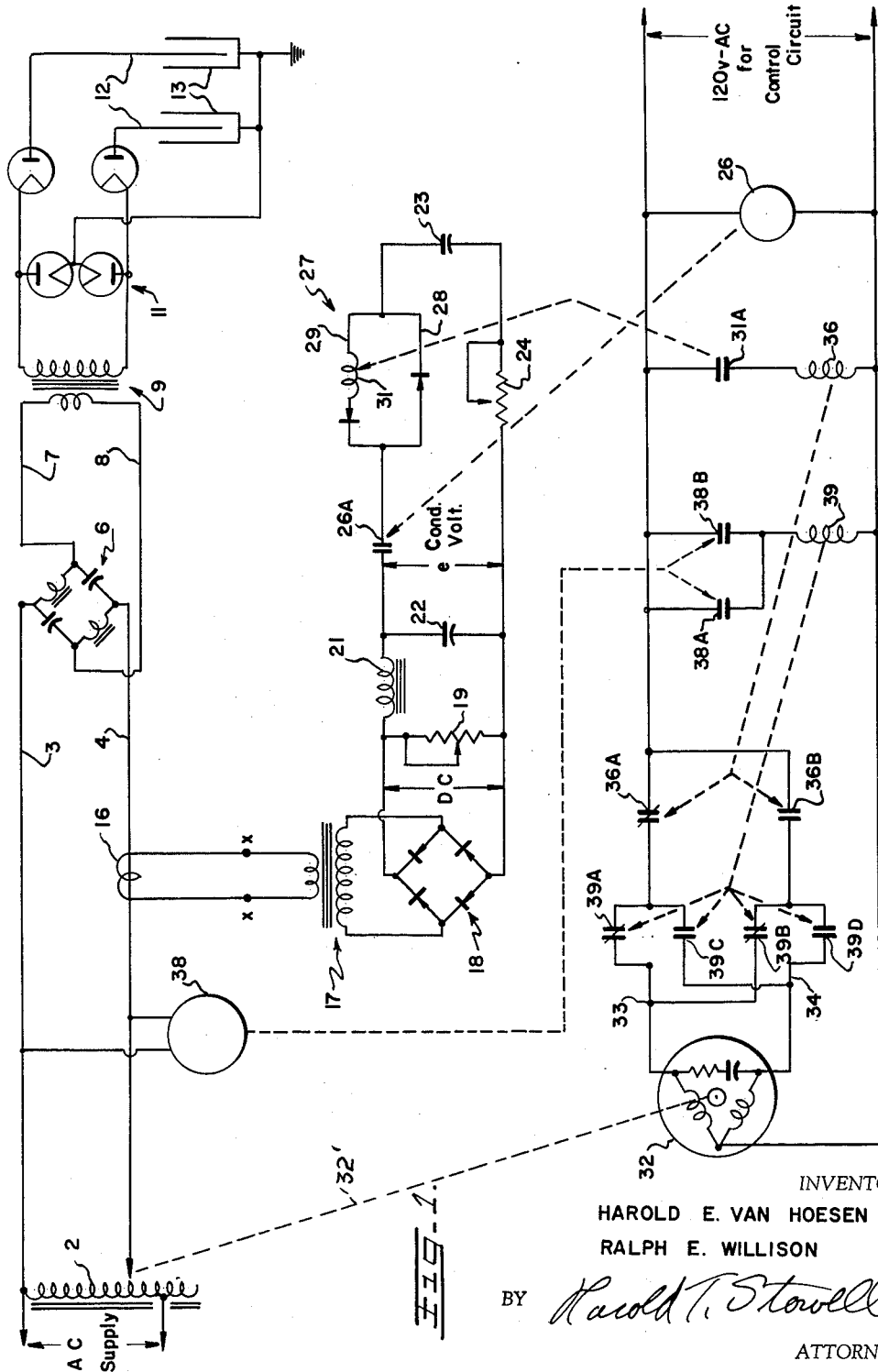
INVENTORS
HAROLD E. VAN HOESEN
RALPH E. WILLISON
BY Harold T. Stowell
ATTORNEY

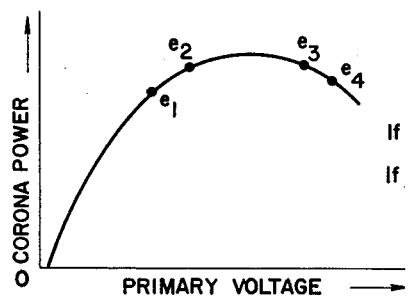
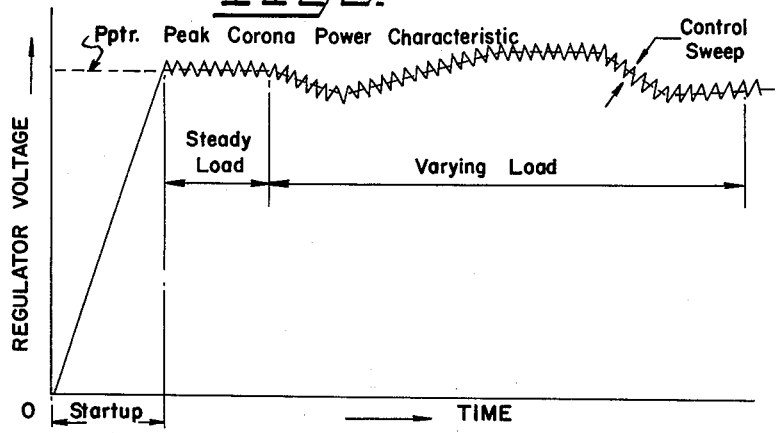
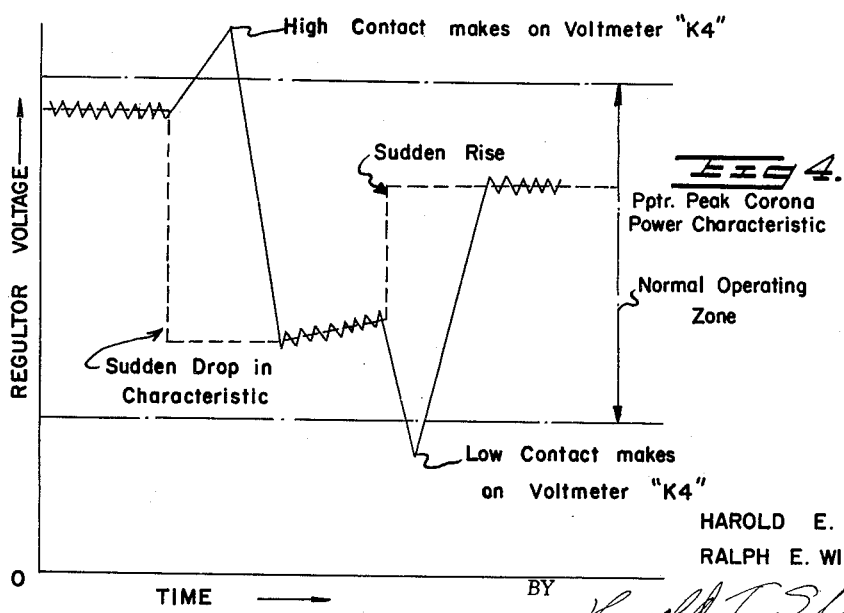
INVENTORS
HAROLD E. VAN HOESEN
RALPH E. WILLISON
BY
ATTORNEY

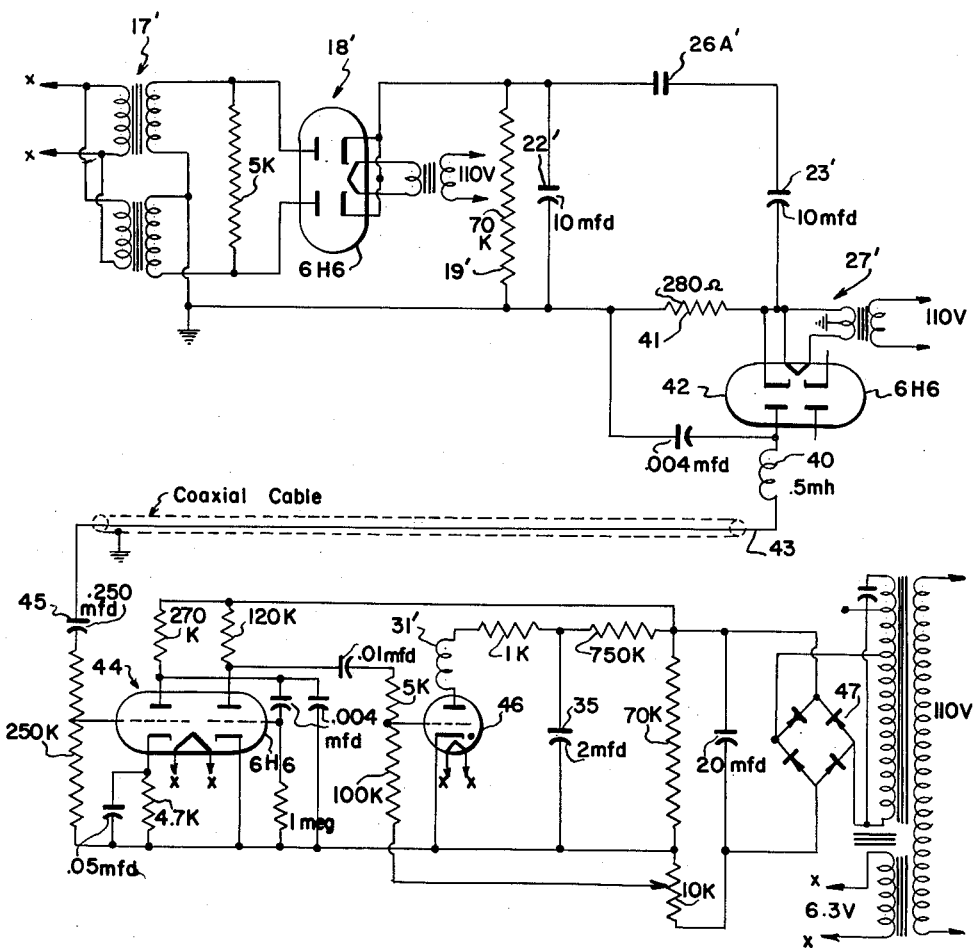

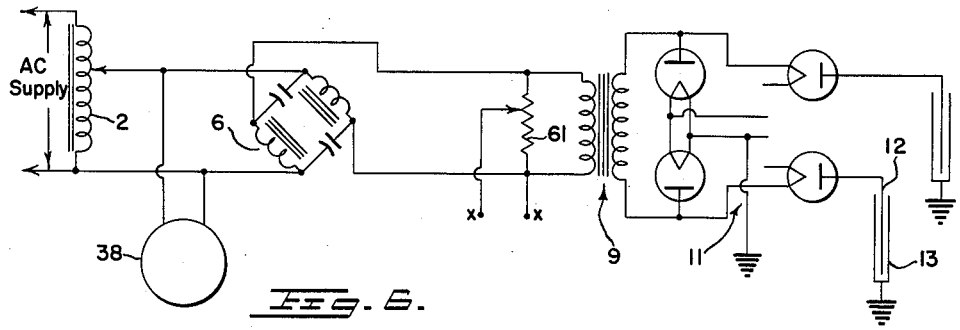
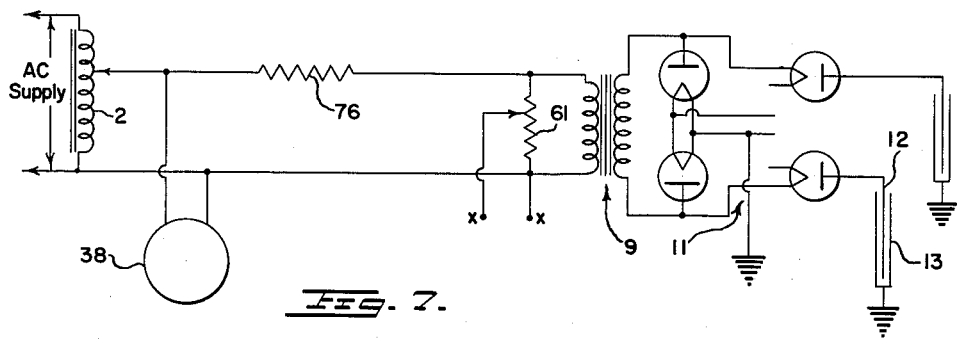
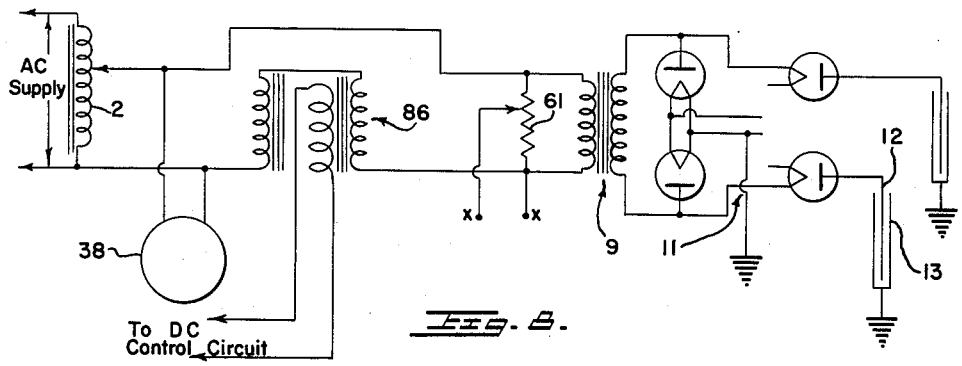

3,039,253
ELECTRICAL PRECIPITATOR POWER SYSTEM
Harold E. Van Hoesen, Somerville, and Ralph E. Willison, North Branch, N.J., assignors to Research Corporation, New York, N.Y., a corporation of New York
Filed May 2, 1956, Ser. No. 582,168
7 Claims. (Cl. 55—105)

This invention relates to the control of electric precipitators and has for its primary object the provision of an automatic control system for maintaining precipitator operation at or near the point of maximum efficiency and power.

The copending application of Guldemond and Van Hoesen, Serial No. 558,633 filed January 12, 1956 for Electrical Precipitator Power System, discloses the basic principle of a precipitator control system which periodically measures the electric power in the precipitator installation and continuously adjusts the voltage input to the precipitator in accordance with power conditions so as to maintain precipitator operation at or near the point of maximum power. The present invention relates generally to an improved maximizing control system, and has for its primary object the provision of improved power-responsive means together with improved and simplified circuitry for controlling the voltage input to the precipitator in accordance with average primary voltage.

Another object of the invention is to provide a simplified control circuit responsive to changes in corona conditions in the precipitator for controlling the voltage input so as to maintain the condition of maximum corona power.

According to the invention, periodic adjustment of the voltage supply to the primary winding of a transformer supplying an electrical precipitator is controlled in response to the change in the average voltage across the primary winding resulting from each periodic adjustment to maximize the average primary voltage. This is effected by sensing the voltage across the primary winding, registering the voltage thus sensed, comparing the registered voltage with the voltage across the primary winding following the subsequent adjustment, and controlling the next adjustment in accordance with the result of such comparison to maintain the average voltage across the primary winding at a maximum.

The sensing of the voltage across the primary winding of the transformer may be effected in various ways. By providing a surge-limiting device such as a monocyclic network in the input circuit to the transformer, the voltage across the primary winding may be measured by inductive coupling with the primary winding or by means of a voltage divider connected across the primary. Various surge-limiters such as a series resistance or a saturable reactor may be used in place of a monocyclic network. When a monocyclic network is used as a surge-limiter, the input voltage across the primary winding may be determined by measurement of the input current to the monocyclic network.

The principles of the invention as well as other objects and advantages thereof will clearly appear from the description of illustrative embodiments as shown in the accompanying drawings, in which:

FIG. 1 is a schematic circuit diagram showing the principle of operation of the invention;

FIG. 2 is an idealized graph showing the typical relationship of primary voltage to corona power consumption in the precipitator;

FIG. 3 is a graph showing the regulator voltage as controlled according to the invention so as to maintain operation at peak corona power level;

FIG. 4 is a graph similar to FIG. 3, showing operation under abnormal conditions and the manner in which correction is made for sudden changes in power characteristic;

FIG. 5 shows the circuit details of a practical comparator relay control system for use with the invention; and FIGS. 6, 7 and 8 show alternate surge limiters which can be used in conjunction with the automatic control.

Referring to FIG. 1, voltage regulator 2 is provided for controlling the voltage of any suitable alternating current supply source to the input circuit 3, 4, of a conventional monocyclic network 6. Such a network has the characteristic that for a given input voltage, the current input on line 3, 4, is a function of the power consumption in its output circuit 7, 8. Lines 7 and 8 are connected to the input of the conventional high voltage transformer 9 of a precipitator rectifier circuit 11, which may be of any known type for supplying high voltage direct current to the electrodes 12, 13 of any known type of precipitator circuit.

As explained in the above referred to copending application, the voltage-power characteristic of an electrostatic precipitator is of the general type shown in FIG. 2. It will be seen that as the input increases, the corona power increases up to a maximum point, beyond which the corona power falls off. This is due to the increased rate of arcing and sparking at the precipitator electrodes as the voltage increases. During arc-over in the precipitator, the voltage across the electrodes drops to a very low value, and the corona power is accordingly reduced. Since the power in the circuit is a function of the product of the in-phase current and voltage, it will be apparent that precipitator collection efficiency is closely related to the electrical power expended in the precipitator. When the input voltage becomes so high that the power is reduced, it clearly becomes necessary to reduce the input voltage until the point of maximum efficiency is again attained. This is accomplished in the apparatus of FIG. 1, as will now be described.

Current transformer 16 is arranged to measure the current in line 4, which, as previously explained, varies with the primary voltage and corona power consumption in the precipitator electrodes. By means of transformer 17, an alternating current voltage is provided which is therefore also a function of the precipitator corona power. This voltage is rectified by any suitable means such as fullwave rectifier 18 to produce a direct current voltage across resistor 19 which is thus also a measure of the power. This voltage may be smoothed out if desired by means of filter choke 21, and is applied to filter capacitor 22. It will thus be apparent that the charge on capacitor 22 is a function of the rate of power consumption at the precipitator electrodes at all times. When the power consumption is reduced, the charge on condenser 22 is higher than the voltage across resistor 19, and the excess charge therefore leaks off through the resistor so that the condenser charge at all times represents the precipitator power. A second capacitor 23, of equal value to capacitor 22, is connected in parallel with condenser 22 whenever timer contacts 26A are closed. Variable resistor 24 is provided for adjusting the time constant of the condenser circuit, and comparator circuit 27 is also provided between the two condensers. As can be seen from the drawing, the comparator circuit is so arranged that when the charge on condenser 22 is higher than that on condenser 23, current will flow through leg 28 of the comparator circuit; conversely, when the charge on condenser 23 is higher, current will flow through leg 29 of the comparator circuit, and in this case, relay 31 will be energized. Timer motor 26 is arranged to intermittently close contacts 26A for a brief period, the timing being such that these contacts are open for a much longer period than they are closed. The contacts 26A are closed for a sufficient length of time to not only actuate relay 31 but also to equalize the charge on condensers 22 and 23 so that at the moment contacts 26A are opened, condenser 23 is also carrying a charge proportional to the precipitator power at that instant. As will be seen below, during the time that the timer contacts 26A are open, the voltage regulator 2 is being changed to a net setting, and the charge on condenser 22 is therefore varying accordingly, while the charge on capacitor 23 remains constant as this capacitor is now open-circuited. When contacts 26A again close, it will be apparent that the relation between the charges on the two condensers will depend upon the nature of the change in precipitator power produced by the previous change in voltage regulator setting. If the precipitator power has increased, the charge on condenser 22 will be greater, and vice versa. If the precipitator power has increased as a result of the last change in input voltage, current flow will be in leg 28 of the comparator circuit, and relay 31 will not be energized, and vice versa. The setting of voltage regulator 2 is controlled by reversible motor 32, through mechanical linkage 32', so arranged that if line 33 is energized the voltage is raised while if line 34 is energized the voltage is lowered. Contacts 36A are normally biased closed when the relay circuit is open; therefore, when contacts 31A of comparator circuit relay 31 are open, the voltage input will continue to be raised. However, when the continued rise in input voltage finally produces a diminution in power, then as explained above, relay 31 will be energized and contacts 31A will be closed to energize relay 36, which will open contacts 36A and close contacts 36B to energize line 34 of motor 32, and thus begin to lower the input voltage. After a suitable period determined by the timer motor 26, timer contacts 26A are again closed, and this time the reduction in input voltage has increased the power output, so that condenser 22 now carries a higher charge than condenser 23; therefore, current will flow through leg 28 of the comparator circuit, relay 31 will be deenergized, relay contact 31A will open, motor contact 36A will now close, and the next change in voltage input will be a rise instead of a reduction. It will be understood that relay 36 is of the flip-flop type which, upon successive closing of contacts 31A, alternately closes contacts 36A and 36B while opening the other contact of the pair. This is somewhat analogous to the action of the ordinary pull-chain switch which alternately opens and closes its contacts each time the chain is pulled. Such relays are commercially available and will not be described in detail.

FIG. 3 shows the normal automatic control action. Assuming the regulator voltage to be initially at zero, it will increase steadily until the point of maximum power is passed, and then the above described control will cause the input voltage to alternately rise and diminish about the points of precipitator peak power. The precipitator peak corona power characteristic is shown in FIG. 3 as a dotted line and it will be noted that it does not remain constant. This is due to changing conditions in the precipitator, including variations in the condition of the gas being cleaned as well as variations in condition of the precipitator electrodes due to deposit of material upon them. However, for any given condition of the precipitator, there is still a peak corona power condition, and the above described control action will maintain the regulator voltage at such a value that precipitator operation will continue in this peak corona power region. The width of the control sweep is a function of the circuit components and can be varied at will. A 2% control sweep is typical.

If there should be a very sudden change in precipitator characteristic, the control may lose the optimum condition as shown in FIG. 4. This could occur if the regulator was raising voltage when the power characteristic dropped abruptly. The regulator would continue to raise voltage when it should drop voltage. To prevent this, a contact-making voltmeter 38 is connected across the regulator. The high and low contacts of this meter are set outside the normal operating range. In this case, the high limit switch on meter 38 would trip relay 39 in one direction so as to interchange the raise and lower circuits 33, 34, of the reversible motor, causing the regulator to reverse and seek the new limit as shown in FIG. 4. Normally, these relays are inoperative since the step change illustrated represents an abnormal condition.

Relay 39 is of the same type as relay 36 in that, when actuated by the brief closing of contacts 38A or 38B, it holds its last-actuated contacts until actuated again on the other contacts.

FIG. 5 shows the details of a suitable circuit for carrying out the functions of FIG. 1. Points x—x of FIG. 5 correspond to points x—x of FIG. 1, and so indicate the leads from the current transformer. Corresponding elements are given corresponding numbers with a prime (') added. It will be seen that instead of solid rectifiers 18, for example, vacuum tube rectifiers 18' are used in FIG. 5, etc.

In the comparator circuit of FIG. 5, when contacts 26A' are closed, if current flows through resistor 41 from condenser 22' to 23', a negative pulse will be emitted from the plate of rectifier 42, but if the reverse is true, a positive voltage pulse will be emitted into coaxial cable 43. A choke coil 40 is provided to minimize the effect of spurious noise signals. Assuming a positive pulse on line 43, this will be transmitted to the grid of the two-stage amplifier 44 which triggers the gas tube 46, which energizes relay 31', corresponding to relay 31 in FIG. 1 by discharge of condenser 35. Gas tube 46 pulses once and is extinguished by the negative pulse overshoot produced by the induction of coil 31'. The remaining elements of the circuit are as shown in FIG. 1.

In the sensing circuit shown in FIG. 6, the input voltage to transformer 9 is measured by means of voltage divider 61 which is connected at x—x to the comparison circuits shown in FIGS. 1 and 5.

In FIG. 7, the surge-limiting device in the primary circuit is resistor 76 and in FIG. 8 the surge-limiting device is saturable reactor 86.

Because of the presence of the high impedance surge-limiting devices in the primary circuit, excessive arcing in the precipitator causes a drop in the primary voltage, which when sensed in the comparator circuit effects a reversal of the direction of operation of the voltage regulator. The voltage regulator will thereafter continue to lower the voltage until it is just below the optimum whereupon the comparator circuit will again cause a reversal of the direction of operation and the cycle of adjustment will be repeated.

It will be apparent that the embodiments shown are only exemplary and that various modifications can be made in construction and arrangement within the scope of the invention as defined in the appended claims.

We claim:

1. An electrical precipitator charging system comprising a transformer, a rectifier in the high voltage output circuit of the transformer supplying the electrodes of the precipitator, means supplying alternating current to the low voltage winding of the transformer, said supply means including means for periodically changing the alternating current input voltage to said low voltage winding, circuit means connected to said alternating current supply, means for comparing the voltage supplied to said low voltage winding prior to each change with the voltage supplied thereto after such change, and circuit means actuated by said comparison means for controlling the succeeding change in a direction to maintain the average voltage supplied to said low voltage winding at a maximum value.

2. An electrical precipitator charging system comprising a transformer, a rectifier in the high voltage output circuit of the transformer supplying the electrodes of the precipitator, an adjustable voltage regulator in the low voltage input circuit of the transformer, regulator control means for periodically adjusting said regulator, a surge-limiting device in the low voltage input circuit of the transformer, means for sensing the voltage across the primary winding of the transformer, means for registering the voltage sensed by said sensing means, comparison circuit means for comparing said registered voltage with the corresponding voltage subsequent to each adjustment of said regulator, and means for actuating said regulator control means in accordance with the output of said comparison circuit to maintain the average voltage supplied to said low voltage winding at a maximum value.

3. An electrical precipitator charging system as defined in claim 2 wherein the surge-limiting device is a monocyclic network.

4. An electrical precipitator charging system as defined in claim 3 wherein the voltage-sensing means comprises a current transformer in the input circuit of the monocyclic network and means for rectifying the output of said current transformer.

5. An electrical precipitator charging system as defined in claim 2 wherein the voltage-sensing means is a voltage divider connected across the primary winding of the transformer and means for rectifying the output of said voltage divider.

6. An electrical precipitator charging system as defined in claim 2 wherein the means for registering the voltage across the primary winding of the precipitator comprises a condenser and means for charging the condenser to a potential controlled by the voltage-sensing means.

7. An electrical precipitator charging system as defined in claim 2 wherein the regulator control means comprises a reversible motor controlled by the comparison circuit means for operation in a direction determined by the output of said comparison circuit.

References Cited in the file of this patent
UNITED STATES PATENTS

| | | |
|---|---|---|
| 1,405,469 | Westcott | Feb. 7, 1922 |
| 1,834,134 | Paschen | Dec. 1, 1931 |
| 2,310,066 | Currier | Feb. 2, 1943 |
| 2,907,403 | Foley | Oct. 6, 1959 |

FOREIGN PATENTS

| | | |
|---|---|---|
| 644,756 | Germany | May 12, 1937 |
| 670,245 | Germany | Jan. 14, 1939 |
| 705,604 | Great Britain | Mar. 17, 1954 |